July 2, 1963     C. SNOWDON     3,096,050
CONTROL APPARATUS FOR JET LIFT AIRCRAFT
Filed Aug. 29, 1960

Charles Snowdon
Inventor
Cushman, Darby & Cushman
Attorneys

United States Patent Office 3,096,050
Patented July 2, 1963

3,096,050
CONTROL APPARATUS FOR JET LIFT AIRCRAFT
Charles Snowdon, Belmont, Belfast, Northern Ireland, assignor to Short Brothers & Harland Limited, Belfast, Northern Ireland, a British company
Filed Aug. 29, 1960, Ser. No. 52,475
Claims priority, application Great Britain Sept. 7, 1959
13 Claims. (Cl. 244—77)

The present invention relates to aircraft of the jet lift type, that is to say, aircraft incorporating one or more jet engines so disposed as to provide a vertically or substantially vertically downwardly directed jet efflux, the resultant upward thrust of which would support the weight of the aircraft during take off and landing manoeuvres and has for its object to provide in such an aircraft automatic control apparatus which will assist the pilot in maintaining a constant flight path angle in the transitional phase between flight in which the weight of the aircraft is sustained solely by aerodynamic lift derived from the wing or like surfaces, and a hovering phase in which the sole support of the weight of the aircraft is derived from the downwardly directed jet engines. It will be understood that the reduction in aerodynamic lift as the aircraft decelerates or pitches must be compensated by a change of lift engine thrust in such a manner as will maintain the aircraft at a constant flight path angle, so that when the hovering phase is reached, the lift engine thrust will exactly oppose the weight of the aircraft, permitting a constant rate of descent.

According to the present invention there is provided for this purpose automatic control apparatus for controlling the thrust generated by one or more vertical lift jet engines in an aircraft of the type specified, said apparatus comprising in combination means for generating signals representative of the acceleration of the aircraft normal to a desired flight path, and a servo system responsive to said signals to adjust the lift engine thrust in such a sense as to reduce such normal acceleration.

One embodiment of the invention will now be described by way of example with reference to the accompanying drawing in which.

Figure 1:
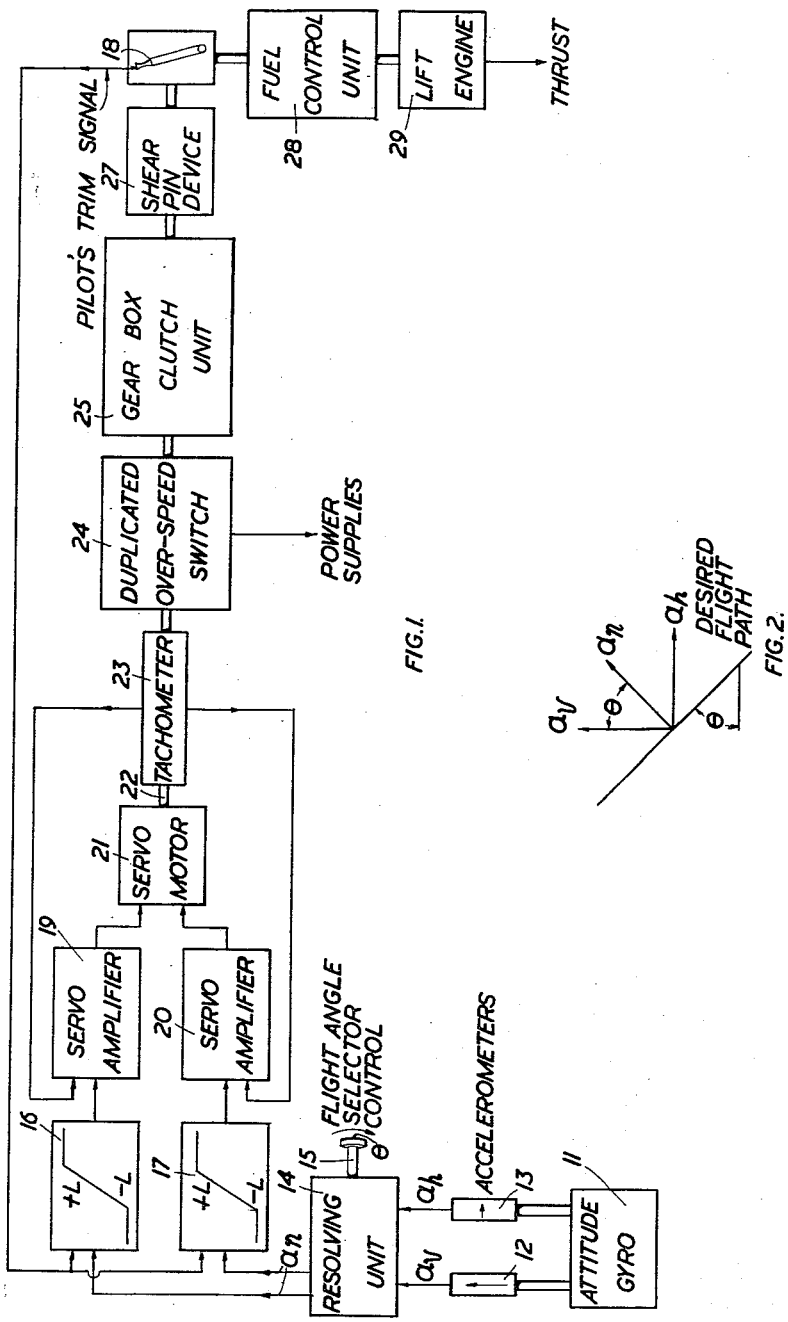
FIG. 1 is a block schematic diagram of automatic control apparatus according to this invention for controlling a lift engine throttle control lever in an aircraft of the type specified.

Referring first to FIG. 1, there is mounted in a jet lift aircraft of the type specified an attitude gyro 11 so arranged as to maintain a fixed attitude in relation to the earth's frame of reference. The gyro 11 has fixedly thereon two accelerometers 12 and 13, the accelerometer 12 being arranged to measure vertical acceleration of the aircraft and to generate a D.C. signal the amplitude of which is $a_v$ representative of this acceleration, and the accelerometer 13 being arranged to measure the horizontal acceleration and to generate a D.C. signal $a_h$ the amplitude of which is representative of the horizontal acceleration. Accelerometers 12 and 13 are of the type well-known in the art, as described, e.g. in Electronic Series M.I.T., vol. 21; The Journal of the Aero S.C.I., vol. 7 (July 1940), pages 338–401. Signals $a_v$ and $a_h$ are fed to a resolving unit 14 which may be of any known form and to which is also fed an input function representative of the angle $\theta$ between the horizon and the desired flight path. In this embodiment of the invention the resolving unit 14 consists of two sine-cosine potentiometers having the wipers fixedly mounted on a flight path angle selector control shaft 15, the angular position of which is representative of the desired flight path angle $\theta$. The resolving unit is likewise well-known in the art as described, e.g. Components Handbook, M.I.T. Series, vol. 17, page 264. The resolving unit 14 is such as to generate a D.C. output signal $a_n$ by operating on the input signals $a_v$ and $$a_v \cos \theta + a_h \sin \theta$$

Figure 2:
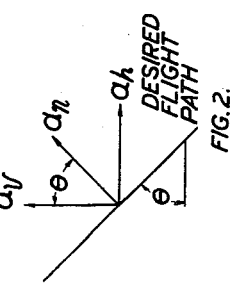
FIG. 2 is a vector diagram of the vertical and horizontal components of acceleration of an aircraft embodying the apparatus shown in FIG. 1.

A vector diagram of the signals $a_v$, $a_h$ and $a_n$ is shown in FIG. 2.

The output signal $a_n$ from the resolving unit 14 is applied to two amplitude limiters 16 and 17 to which are also fed a signal derived from a transducer mounted on a lift engine throttle control lever 18. The output signals from the amplitude limiters 16 and 17 are applied to servo amplifiers 19 and 20 in which they are amplified and from which they are fed to operate a servo motor 21. The servo motor 21 drives an output shaft 2 coupled to actuate the control lever 18. As will be appreciated, the angular displacement of the output shaft 22 is proportional to the amplitude of the signal fed thereto.

A tachometer 23 is mounted on the servo motor output shaft 22 and generates a feed back signal proportional to the rate of change of the angular position $\phi$ of the shaft 22. This signal is fed back to the input of each of the amplifiers 19 and 20 and enables rate limiting of the servo motor to be made as is explained hereinafter. Also mounted on the motor output shaft 22 is an overspeed switch 24, duplicated for safety, which switches off power supplies to the servo-motor 21 should this, through some fault in the rate limiting arrangement, attempt to rotate at a speed somewhat greater than that corresponding to the rate limit.

The motor output shaft 22 is connected through a gear box clutch unit 25 the output of which is connected through a sheer pin or other safety device 27 to the lift engine throttle control lever 18. The throttle control lever 18 is connected to control the fuel output from a fuel control unit 28 supplying fuel to a lift engine 29, so that displacements of the lever 18 demand a change in lift engine thrust and hence in normal acceleration.

In operation, in response to an acceleration of the aircraft in a direction normal to the desired flight path, the resolving unit 14 produces a signal $a_n$ representative of this acceleration. This signal is applied to operate the servo motor 21 which is arranged to drive the control lever 18 in such a sense as to adjust the fuel supply to the lift engine 29 so that the acceleration of the aircraft normal to the desired flight path is reduced. The arrangement is so stabilised that the aircraft maintains or tends to maintain the desired flight path angle.

The amplitude limiter 16 is such as to produce an output signal the amplitude of which is limited to a predetermined level L so that the signal applied by it to the servo amplifier does not exceed this level. The signal from the tachometer 23 is proportional to the rate of change of the angular position $\phi$ of the output shaft 22 of the servo motor 21 and is represented by the expression $a\dot{\phi}$ where $a$ is a constant and $\dot{\phi}$ is the angular position of the servo motor output shaft. The signal $a.\dot{\phi}$ is applied to the servo amplifier in a negative sense so that the combined applied signal is equal to the difference between the signal from the amplitude limiter 16 and the signal from the tachometer 23, and in the case where a large acceleration signal $a_n$ is applied to the limiter 16 the combined signal is equal to $$L - a\dot{\phi}$$

This signal is amplified and applied to drive the servo motor 21, the torque developed by the latter being proportional to the signal. When the speed of the motor 21 increases sufficiently to make $$\dot{L} = a\dot{\phi}$$

then the input signal to the servo motor becomes zero. The torque applied thereto also becomes zero and the servo motor then runs at a steady rate given by $$\dot{\phi} = \frac{L}{a}$$

This steady rate continues until the acceleration signal $a_n$ has been reduced so far that no amplitude limiting occurs. When this happens $\dot{\phi}$ decreases to zero.

The provision of two separate parallel channels between the resolving unit 14 and the input to the servo motor 21 is a safety measure, the arrangement being such that if a fault occurs in one lane the other lane prevents runaway.

In the case of gear box and clutch unit 25 jamming, the pilot may always mechanically uncouple his lift engine throttle control lever 18 from the servo system by breaking the safety device 27, leaving him in full manual control of the fuel control unit 28 which is connected by a rigid linkage to his lift engine throttle control lever 18.

If he should wish to change the lift engine thrust at a rate greater than the rate limit that the servo-motor 21 allows, he may override the system by slipping the clutch unit 25 without causing any damage, achieve the required change in engine thrust, and then allow the automatic apparatus to resume control.

When hovering, the flight path selector control is switched to a horizontal flight path, in which case it is the output of the vertical accelerometer alone which actuates the amplitude-limiting amplifiers 16 and 17.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What I claim as my invention and desire to secure by Letters Patent is:

1. Automatic control apparatus for controlling the thrust generated by one or more vertical lift jet engines in an aircraft of the type specified, said apparatus comprising, in combination, accelerometers for generating component signals representative of the vertical and horizontal accelerations of the aircraft, resolving means for deriving from said component signals an output signal representative of the acceleration of the aircraft normal to any desired flight path angle, and a servo system responsive to said output signal to adjust the lift engine thrust to reduce such normal acceleration.

2. Apparatus according to claim 1, comprising a gyroscopic device adapted to maintain a fixed attitude in relation to a datum plane, and wherein said accelerometers are carried by said device so as also to maintain said fixed attitude.

3. Apparatus according to claim 2, wherein said resolving means includes an electrical circuit to which said component signals are applied, manually adjustable means to operate on said signals according to the angle between the datum plane and the desired flight path.

4. Apparatus according to claim 3, wherein said manually adjustable means includes a rotatable shaft of a sine and cosine potentiometer arrangement.

5. Apparatus according to claim 1, wherein the signal representative of the acceleration normal to the selected flight path angle is applied to operate a servo motor coupled to drive a lift control lever controlling the lift engine or engines in such a way as to adjust the amount or direction of the thrust derived therefrom.

6. Apparatus according to claim 1, including a servo-motor, means for applying to said servo-motor signals representative of the acceleration normal to the selected flight path angle, and a lift control lever controlling the lift engine or engines to vary the amount of lift or thrust derived therefrom, said lift control lever being coupled to be driven by said servo-motor.

7. Apparatus according to claim 6, including a tachometer connected to be driven by the servo-motor and to generate a feedback signal portional to the rate of change of output of the servo-motor and means to apply said feedback signal to modify the signal input to the servo-motor, said feedback signal being applied in opposition to the signal representative of the said normal acceleration.

8. Apparatus according to claim 6, including a driving connection between the output of the servo-motor and the lift control lever, said driving connection including a safety device operable by the pilot to uncouple the output of the servo-motor from said lever, thereby to permit the pilot to exercise full manual control of the lever.

9. Apparatus according to claim 6, including clutch means connecting the output of the servo-motor to the lift control lever, whereby the pilot can override the servo-motor and exercise full manual control of said lever.

10. Apparatus according to claim 6, wherein the lift control lever serves to control the fuel supply to the said one or more lift jet engines.

11. Automatic control apparatus for controlling the thrust generated by one or more vertical-lift jet engines in an aircraft of the type specified, said apparatus comprising, in combination, accelerometers for generating component signals representative of the vertical and horizontal accelerations of the aircraft with respect to a horizontal datum plate fixed in space, manually adjustable resolving means to derive from said component signals an output signal representative of the acceleration of the aircraft normal to any pre-selected flight path angle, and a servo system responsive to said output signal to adjust the lift engine thrust to reduce such normal acceleration.

12. Automatic control apparatus for controlling the thrust generated by one or more vertical-lift jet engines in an aircraft of the type specified, said apparatus comprising, in combination, accelerometers for generating component signals representative of the vertical and horizontal accelerations of the aircraft with respect to a datum plane fixed in space, manually adjustable resolving means including an electrical circuit to which said component signals are applied and a manually adjustable control element for adjusting said circuit according to the angle between the datum plane and the desired flight path to generate an output signal representative of the acceleration of the aircraft normal to the pre-selected flight path angle, and a servo system responsive to said output signal to adjust the lift engine thrust to reduce such normal acceleration.

13. Automatic control apparatus for controlling the thrust generated by one or more vertical-lift jet engines in an aircraft of the type specified, said apparatus comprising, in combination, a gyroscopic device adapted to maintain a fixed attitude in relation to a horizontal datum plane fixed in space, accelerometers mounted in fixed relation to said gyroscopic device to generate component signals representative of the vertical and horizontal accelerations of the aircraft with respect to said datum plane, manually adjustable resolving means including a sine and cosine potentiometer arrangement to which said component signals are applied to generate an output signal representative of the acceleration of the aircraft normal to a preselected flight path angle determined by the angular position of a rotatable shaft forming part of said sine and cosine potentiometer arrangement, and a servo system responsive to said signals to lift the jet engine thrust to reduce said normal acceleration.

References Cited in the file of this patent

UNITED STATES PATENTS

| | | |
|---|---|---|
| 2,691,127 | Oliwa | Oct. 5, 1954 |
| 2,861,756 | Feucht | Nov. 25, 1958 |
| 2,873,074 | Harris | Feb. 10, 1959 |
| 2,945,649 | Metcalf | July 19, 1960 |
| 2,977,070 | Burner | Mar. 28, 1961 |
| 2,979,290 | Baliguet | Apr. 11, 1961 |